United States Patent Office

2,714,588
Patented Aug. 2, 1955

2,714,588
COPPER-CONTAINING DISAZO DYESTUFFS

Ernst Keller, Basel, Switzerland, assignor to J. R. Geigy A. G., Basel, Switzerland, a Swiss firm No Drawing. Application January 28, 1952, Serial No. 268,694

Claims priority, application Switzerland February 7, 1951

9 Claims. (Cl. 260—148)

The present invention is concerned with the production of blue copper-containing disazo dyestuffs. It deals with the production of unsymmetrical copper-containing disazo dyestuffs of the diphenyl series which are distinguished from previously known similar copper-containing disazo dyestuffs by their better drawing power on to cellulose fibres.

Disazo dyestuffs have been described in German Patent No. 196,924 which are obtainable by coupling tetrazotised dianisidine with equimolecular amounts of both a 1-hydroxynaphthalene-3-sulphonic acid which may contain a further sulphonic acid group and if desired a further hydroxy group in the 8-position, and 2-phenyl-amino-5-hydroxynaphthalene-7-sulphonic acid. These dyestuffs produce reddish-blue substantive dyeings on cellulose fibres. It was only later found that such o-hydroxy-o'-alkoxyazo dyestuffs could be after-treated with copper salts either in substance or on the fibre whereby dyestuffs containing complexly bound copper result which have a considerably improved fastness to light. Generally the coppering process is accompanied by a considerable reduction in the water solubility, so that for coppering in substance only those dyestuffs can be considered which, as complex copper compounds, have sufficient water-solubility for textile dyeing purposes; i. e. in general, dyestuffs which contain a larger amount of sulphonic acid groups than would be necessary or usual for the corresponding non-copper-containing dyestuffs. A later process, therefore, describes the production of comparable but coppered disazo dyestuffs which process consists in coupling tetrazotised 4.4'-diamino-3.3'-dialkoxydiphenyl with equimolar amounts of 1-hydroxy-naphthalene- 3.6.8-trisulphonic acid and 2-amino-5-hydroxynaphthalene-7-sulphonic acid or their derivatives and after-treating the disazo dyestuffs so obtained with agents giving off copper.

In contrast to this, it has now been found that coppered disazo dyestuffs with sufficient water solubility for dyeing purposes can be obtained if a tetrazotised 4.4'-diamino-3.3'-dialkoxydiphenyl is coupled with an equimolar amount of 1-hydroxynaphthalene-3.8- or -4.8-disulphonic acid and with an equimolecular amount of a coupling component of the general formula:

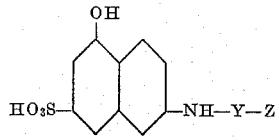

wherein

Y represents a phenyl or diphenyl radical which may be further substituted and

Z represents an acylamino radical in the p-position to the amino group and then the unsymmetrical disazo dyestuff so obtained is treated in substance with agents giving off copper.

A o.o'-dialkoxy tetrazo compound usable according to the present invention, most advantageously that of o-dianisidine comes into consideration. The 1-hydroxynaphthalene-3.8-disulphonic acid is to be preferred to the -4.8-disulphonic acid because it produces end products of a somewhat more pure shade. For the same reason those 2-amino-5-hydroxynaphthalene-7-sulphonic acid derivatives which are substituted by a phenyl radical in the amino group are to be preferred to those substituted by a diphenyl radical. Radicals of carboxylic acids of the benzene series (designated as aroyl radicals) but preferably radicals of lower fatty acids (designated as alcoyl radicals) and of carbonic acid half esters of lower alcohols (designated as carbalkoxy radicals) come into question as acyl radicals in these aminonaphthol coupling components.

The coupling of the tetrazo-3.3'-dialkoxydiphenyl compound usable according to the invention must take place in stages by reacting it separately in any order with both coupling components in an alkaline medium; the use of naphtholdisulphonic acid for the first reaction is advantageous.

The disazo dyestuffs according to the present invention can be coppered according to methods known per se in an aqueous solution or suspension at a raised temperature by treatment with agents giving off copper, if desired in the presence of the usual additives such as wetting and dispersing agents or of salts such as sodium phosphates or sodium chloride. Normal and complex salts of copper with inorganic or inorganic anions, in particular also copper ammino complex salts with ammonia or suitable organic basic amines, e. g. copper chloride, copper sulphate, copper acetate, their cupritetrammine salts, further complex copper salts of aliphatic α-hydroxy and α-aminocarboxylic acids such as tartaric acid or glycocoll come into question as agents giving off copper.

In the form of their alkali salts, the new copper-containing disazo dyestuffs are dark powders which dissolve easily in water with a blue colour and draw well from a dyebath containing Glaubers salt on to natural and regenerated cellulose fibres. In general their drawing power is superior to that of the comparable copper-containing disazo dyestuffs mentioned above. In addition, the cellulose dyeings obtained therewith are very fast to light, are characterized, according to the composition of the dyestuff used as stated above, by great pureness of shade. Some of the dyeings have better fastness to water and, as a further very valuable property, have a better fastness to light after anti-crease processing.

The following examples illustrate the invention without limiting it in any way. Where not otherwise stated, parts are given as parts by weight and the temperatures are in degrees centigrade.

*Example 1*

24.4 parts of o-dianisidine are tetrazotised in the usual way and coupled under ice cooling with 30.4 parts of 1-hydroxynaphthalene-4.8-disulphonic acid in a soda alkaline solution. On completion of the formation of the intermediate product, a soda alkaline solution of 37.2 parts of 2-(4'-acetylamino-phenylamino)-5-hydroxy-naphthalene-7-sulphonic acid is poured in and the whole is stirred until the coupling is complete. The disazo dyestuff so formed is salted out and isolated. It dissolves in water with a blue colour and dyes cellulose fibres in vivid blue shades. The fastness to light can be considerably improved by after-treatment with copper sulphate.

The disazo dyestuff is dissolved at 80–85° in 2500 parts of water and added at this temperature to a copper oxide ammonia solution containing 50 parts of crystallised copper sulphate and 120 parts of concentrated aqueous ammonia. The whole is heated for 4–5 hours at 80–85° and after addition of a further 50 parts of a concentrated ammonia solution, heated for 15–20 hours at 90–95°. The copper complex so formed is salted out, filtered and dried. It is a dark powder which dissolves in water with a blue colour and draws excellently from an aqueous bath on to cotton, linen and regenerated cellulose fibres. The dyeings are very fast to light and the shade and fastness to light are hardly affected by anti-crease processing.

A product which dyes cellulose fibres in considerably more reddish shades is obtained if the metallising process is performed in a weakly acid medium, e. g. as follows:

The disazo dyestuff is stirred into a homogeneous paste with 500 parts of water. 200 parts of an aqueous copper sulphate solution containing 50 parts of crystallised copper sulphate and, after a few minutes 60 parts of crystallised sodium acetate in concentrated solution are poured in. After stirring at room temperature for several hours until a completely homogeneous paste is obtained, it is dried in vacuo at 120–125°.

Example 2

24.4 parts of o-dianisidine are tetrazotised in the usual way and coupled under ice cooling with 32 parts of 1-hydroxynaphthalene-3.8-disulphonic acid in a soda alkaline solution. An ammonia alkaline solution of 37.2 parts of 2-(4'-acetylamino-phenylamino)-5-hydroxynaphthalene-7-sulphonic acid is poured on to the intermediate product and the whole is stirred until the coupling is complete. The disazo dyestuff so formed is salted out and converted into the copper complex as described in Example 1. The dry copper complex is a dark powder which dissolves in water with a blue colour and dyes cellulose fibres in pure blue shades which are distinguished by their very good fastness to water and light and in particular by their very good fastness to anti-crease processing.

The disazo dyestuff can be converted into the copper complex in the presence of organic bases such as pyridine, diethylamine, triethylamine, glycocoll.

Similar dyestuffs are obtained if in the above example, the 2 - (4' - acetylamino - phenylamino) - 5 - hydroxynaphthalene-7-sulphonic acid is replaced by 2-(4'-carbomethoxyamino-phenylamino)- or 2-(4'-carbethoxyamino-phenylamino)-5-hydroxynaphthalene-7-sulphonic acid.

Example 3

An ammoniacal solution of 43.2 parts of the following compound

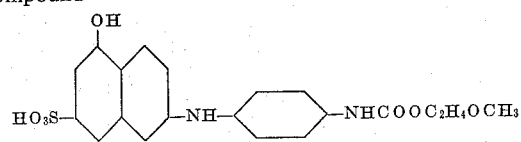

is poured into the intermediate product from 24.4 parts of tetrazotised o-dianisidine and 30.4 parts of 1-hydroxynaphthalene-3.8-disulphonic acid. The whole is stirred until the coupling is complete. The dyestuff is converted into the copper complex as described in Example 1. It dyes cellulose fibres in vivid blue shades which are very fast to water and light.

Further similar dyestuffs are obtained if the urethane described above is replaced by the following compounds:

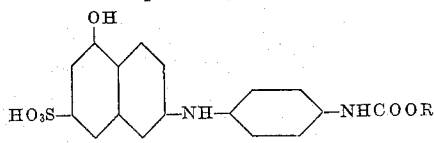

wherein R represents, for example, the following radicals:

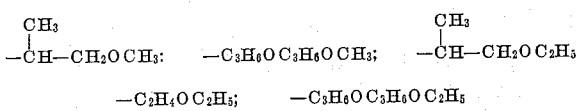

Example 4

A soda alkaline solution of 52.8 parts of 2-(4'-acetylamino - 3' - sulphodiphenylamino) - 5 - hydroxynaphthalene-7-sulphonic acid is poured into the intermediate product from 24.4 parts of tetrazotised o-dianisidine and 30.4 parts of 1-hydroxynaphthalene-3.8-disulphonic acid and the whole is stirred until the dyestuff is completely formed. The disazo dyestuff is converted into the copper complex in the usual way with copper oxide ammonia solution by heating to 90–95° for 30 hours. It is a dark powder which dissolves in water with a blue colour and dyes cellulose fibres in blue shades which are very fast to light.

Example 5

A soda alkaline solution of 43.5 parts of 2-(4'-benzoylamino - phenylamino) - 5 - hydroxynaphthalene - 7 - sulphonic acid is poured into the intermediate product from 24.4 parts of tetrazotised o-dianisidine and 30.4 parts of 1-hydroxynaphthalene-3.8-disulphonic acid and the whole is stirred until the dyestuff is completely formed. The disazo dyestuff is converted into the copper complex as described in Example 1, isolated and dried. The copper compound is a dark powder which dissolves in water with a blue colour and dyes cellulose fibres in vivid blue shades which have very good fastness to light and good fastness to water.

Further similar dyestuffs are obtained if in the above example, the 2 - (4' - benzoylamino - phenylamino) - 5 - hydroxynaphthalene-7-sulphonic acid is replaced by 2-(4'-salicoylamino - phenylamino) - 5 - hydroxynaphthalene-7-sulphonic acid or by 2-(4'-p-toluylamino-phenylamino)-5-hydroxynaphthalene-7-sulphonic acid.

Example 6

1 part of the dyestuff obtained according to Example 2 is dissolved in a dyebath containing 30 parts of Glaubers salt and 1 part of soda in 4000 parts of water. 100 parts of cotton are entered at 30°, the bath is heated to 90° within 30 minutes and dyeing is performed for 1 hour at this temperature. The cotton which has been dyed blue is rinsed and dried.

What I claim is:

1. The complex copper compound of a disazo dyestuff having the general formula:

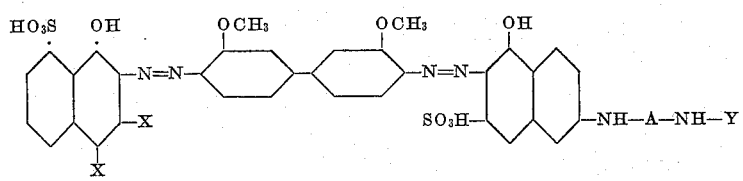

wherein one X represents hydrogen and the other X represents the SO₃H group, A represents a member selected from the group consisting of 1.4-phenyl and 4.4'-diphenyl radicals and Y represents a member selected from the group consisting of alcoyl radicals, carbaloxy radicals and aroyl radicals of the benzene series.

2. The complex copper compound of a disazo dyestuff having the general formula:

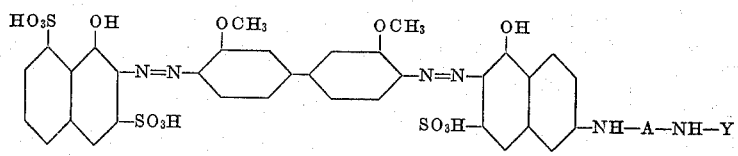

wherein A represents a 1.4-phenyl radical and Y represents an aroyl radical.

3. The complex copper compound of a disazo dyestuff having the general formula

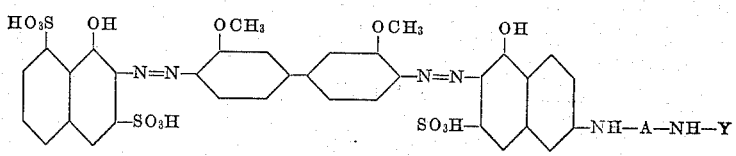

wherein A represents a 1.4-phenyl radical and Y represents an alcoyl radical.

4. The complex copper compound of a disazo dyestuff having the general formula

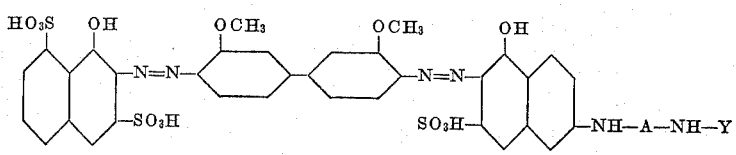

wherein A represents a 1.4-phenyl radical and Y represents a carbaloxy radical.

5. The complex copper compound of a disazo dyestuff having the formula:

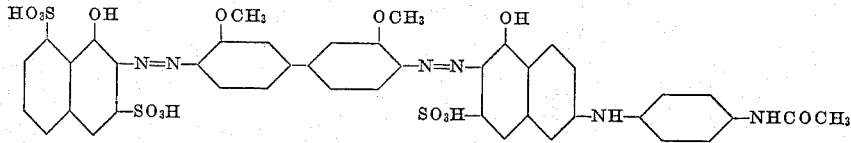

6. The complex copper compound of a disazo dyestuff having the formula:

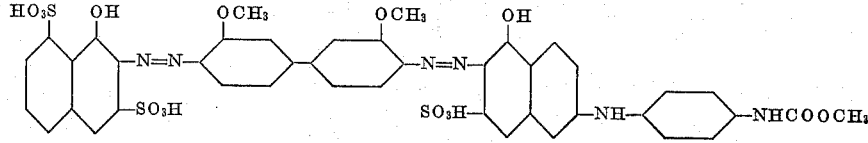

7. The complex copper compound of a disazo dyestuff having the formula:

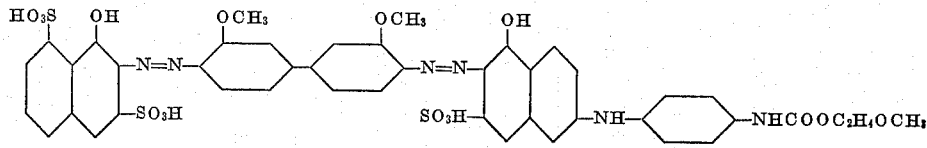

8. The complex copper compound of a disazo dyestuff having the formula:

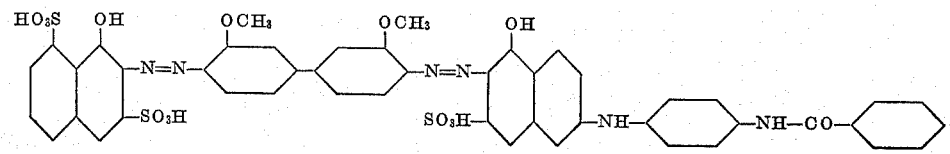

9. The complex copper compound of a disazo dyestuff having the formula:
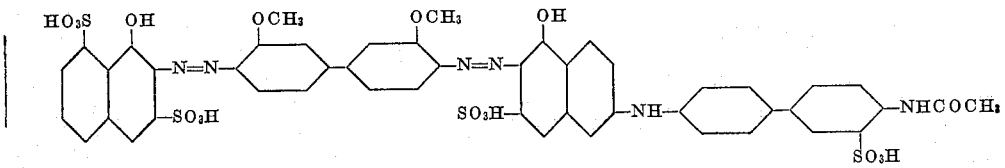
References Cited in the file of this patent
UNITED STATES PATENTS
| | | |
|---|---|---|
| 1,887,602 | Straub | Nov. 15, 1932 |
| 1,889,732 | Stusser | Nov. 29, 1932 |
FOREIGN PATENTS
| | | |
|---|---|---|
| 268,405 | Switzerland | Aug. 16, 1950 |